United States Patent [19]

Elevitch

[11] 4,455,763
[45] Jun. 26, 1984

[54] COFFEE ROASTER

[76] Inventor: Franklin R. Elevitch, 430 Nevada Ave., Palo Alto, Calif. 94301

[21] Appl. No.: 282,153

[22] Filed: Jul. 10, 1981

Related U.S. Application Data

[63] Continuation-in-part of Ser. No. 240,757, Mar. 5, 1981, Pat. No. 4,425,720.

[51] Int. Cl.$^3$ ............................................. F26B 25/18
[52] U.S. Cl. ..................................... 34/233; 34/237; 34/238; 126/275 E; 426/113; 99/450; 219/386; 219/405; 219/521; 220/3.5
[58] Field of Search ................... 426/113; 34/225, 233, 34/237, 238; 126/275 E; 99/447, 286, 450, 443 C; 219/385–388, 400, 405, 436, 438, 521; 220/3.5 MF

[56] References Cited

U.S. PATENT DOCUMENTS

| | | | |
|---|---|---|---|
| 270,503 | 1/1883 | Stopple | 34/233 |
| 3,258,854 | 7/1966 | Ascoli et al. | 34/237 |
| 3,640,209 | 2/1972 | Wilson | 229/3.5 MF |
| 3,741,427 | 6/1973 | Doyle | 229/3.5 MF |
| 4,271,603 | 6/1981 | Moore | 34/181 |
| 4,380,127 | 4/1983 | Roberts | 34/237 |

OTHER PUBLICATIONS

Ukers—"All About Coffee"—The Tea & Coffee Trade Journal Company—1935, pp. 575-596.

*Primary Examiner*—Larry I. Schwartz
*Attorney, Agent, or Firm*—Edward B. Gregg

[57] ABSTRACT

Roaster for green coffee beans and other beans and nuts comprising a dish or tray, preferably of lightweight, disposable construction having a rim of sufficient height to contain the beans or nuts during roasting and a bottom which is formed with openings, the number, size and pattern of openings being such as to support the beans or nuts yet to allow free and uniform flow of hot air and gases from below the roaster through a mass of beans or nuts on the bottom. The tray bottom is preferably formed with downward extensions of the material, e.g., material resulting from piercing the tray bottom. Also, the same roaster but with a downwardly extending rim or legs to support the bottom above an open source of heat and a cover fitting the upper edge of the rim with an opening permitting escape of air and gases. Also, such roasters with a supply of green beans or nuts to be roasted and a disposable cover or enclosure enclosing the roaster and beans. The roaster is preferably made of metal, e.g., aluminum foil.

3 Claims, 7 Drawing Figures

U.S. Patent   Jun. 26, 1984   Sheet 1 of 2   4,455,763
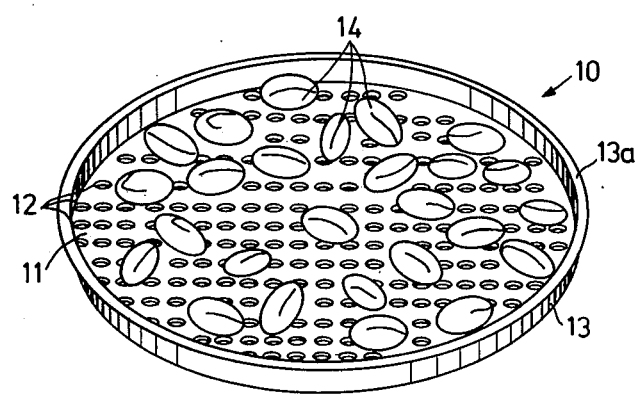
FIG.1
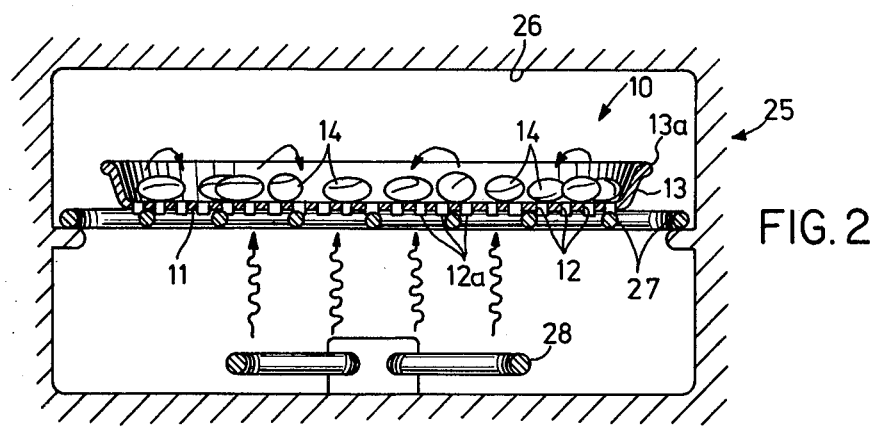
FIG.2
FIG.3
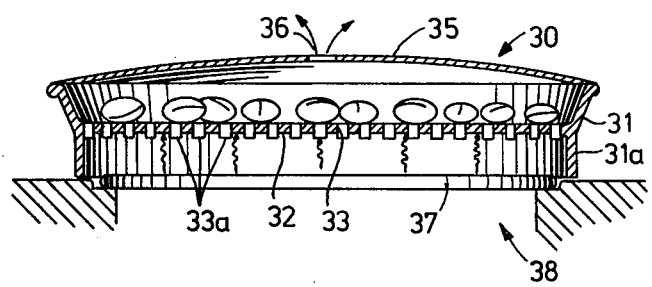
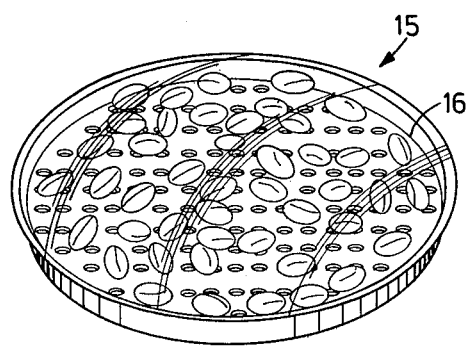
FIG.4
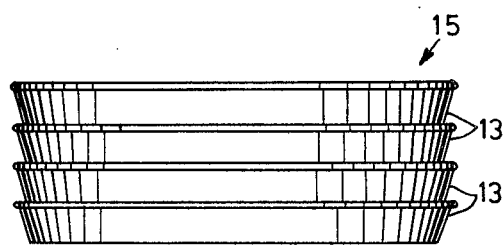
FIG.5

COFFEE ROASTER

This application is a continuation-in-part of my copending application, Ser. No. 240,757, now U.S. Pat. No. 4,425,720, filed Mar. 5, 1981, entitled "COFFEE ROASTER".

In my copending application referred to above, a coffee roaster is described which is preferably made of metal such as copper or aluminum and which provides an efficient and simple roaster for roasting green coffee beans in the household. It comprises in one embodiment a cylindrical metal housing having an open bottom for access of heat and circulation of hot air, a removable cover having a central opening for efflux of air and gases resulting from the roasting operation, and, between the open bottom and the cover, a perforated plate. The perforations allow free flow of hot air through a mass of beans supported upon the perforated plate. The perforations are small enough in diameter that the beans are supported and are not permitted to drop below the plate.

There is a need for a coffee roaster operating on the same or similar principles which is of simpler and less expensive design such that it can be used once or a few times and discarded.

It is an object of the present invention to provide an improved coffee roaster employing the principles of the coffee roaster of my aforesaid copending application.

It is another object of the invention to provide a disposable coffee roaster suited for use domestically to roast green coffee beans and which is of a design and employs materials of construction such that it is a disposable entity.

A further object of the invention is to provide a disposable coffee roaster for domestic use which can be supplied as a unitary package including a supply of packaged or unpackaged green coffee beans and a removable cover which encloses the roaster structure and the green beans and allows the package to be shipped and stored.

The above and other objects of the invention will be apparent from the ensuing description and the appended claims.

Certain embodiments of the invention are shown by way of example in the accompanying drawings, in which:

FIG. 1 is a perspective view of one embodiment of the roaster of the present invention;

FIG. 2 shows the roaster of FIG. 1 in an oven during the roasting process, the roaster being shown in vertical mid-section;

FIG. 3 shows another embodiment adapted for use in the open on top of a hot plate or other open source of heat;

FIG. 4 shows the roaster of FIG. 1 enclosed by a removable cover and with a supply of green coffee beans ready for use;

FIG. 5 shows the manner in which the coffee roasters of FIGS. 1 or 3 may be nested together.

Figure 6:
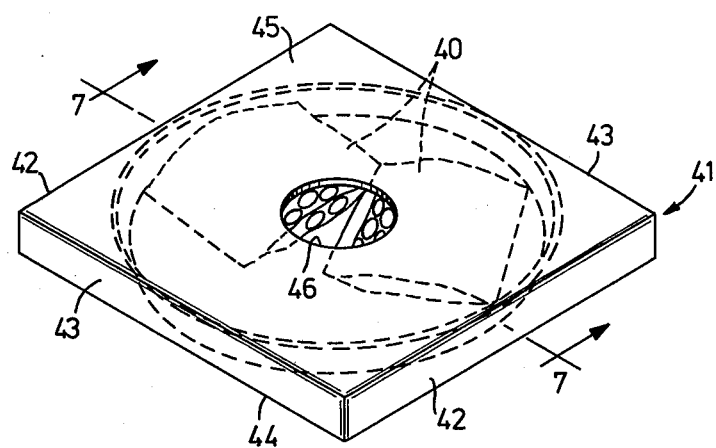
FIG. 6 shows another and preferred way to package the roaster of FIG. 1.

Referring now to the drawings and preliminarily to FIG. 1, the coffee roaster is generally designated by the reference numeral 10. It is preferably made of a foil which is sufficiently heavy to allow normal handling, storage and shipment and to allow manipulation by the ultimate user. For example, aluminum foil having a thickness of about 0.0035 inch may be employed for this purpose. This roaster comprises a bottom portion 11 formed with openings or perforations 12 and a rim 13 completely surrounding the bottom portion 11. Coffee beans are shown at 14 in this roaster. The rim may be formed with a bead 13a.

The perforations 12 may be formed conveniently by piercing from above and leaving downwardly projecting portions of metal 12a. These perforations and downward projections may also be formed by molding. I have found that these downward projections aid materially in the roasting process, evidently by acting as heat conductors and/or as chimneys to aid the draught in roasting.

Figure 7:
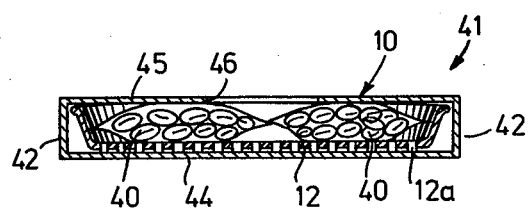
FIG. 7 is a section along the line 7—7 of FIG. 16.

Referring now to FIG. 4, this figure shows how the coffee roaster of FIG. 1 (likewise that of FIG. 3) may be packaged. The package is generally designated by the reference numeral 15, the roaster proper being indicated by the reference numeral 10 in FIG. 1. The roaster 10 is completely enclosed in a suitable wrapper 16. This may be, as shown, a transparent wrapper such as cellophane, polyethylene or any transparent film material which is suitable for use in contact with food products. Alternatively, it may be an opaque material such as paper or aluminum foil. An alternative packaging is shown in FIGS. 6 and 7 and is described below. The beans may be enclosed in a bag as in FIGS. 6 and 7.

Referring now to FIG. 2, an oven is shown which is generally designated by the reference numeral 25, the interior oven cavity being indicated as 26. Within this cavity there is a support 27 for the roaster 10 and beneath this support are heating coils 28. As will be seen, hot air rising from the coils 28 ascends through the openings 12 in the bottom 11 of the roaster 10. As explained in my copending application, the coffee beans will first undergo a drying phase and then, when all or most of the moisture has been removed they will tend to pop and jump about. Roasting then takes place. The completion of roasting is indicated when the beans assume a uniformly brown hue. Experience will indicate the hue of brown according to the user's preference.

Referring now to FIG. 3, a modified roaster is provided which is generally designated by the reference numeral 30. The roaster proper comprises a rim 31 and a bottom portion 32 with openings 33 and it also comprises a downward extension of the rim 31 as shown at 31a. It is also provided with a cover 35 formed with an opening 36. This may form a snap fit with the rim 31 or it may lie loose on it. The roaster 30 is shown sitting on a hot plate 37 of a stove 38. This embodiment with its cover 35 and a lower rim 31a is better suited than the embodiment of FIGS. 1 and 2 to an open source of heat. The oven 25 in FIG. 2 provides an enclosure and a support spaced above the source of heat. The embodiment of FIG. 3 may, however, be used, with or without the cover 35, in an oven. Downward projections 33a corresponding to projections 12a in FIG. 2 are shown. These need not be present but are preferred.

The perforations 12 in FIG. 1 and 33 in FIG. 3 are preferably uniformly distributed. The individual perforations are preferably not so small as to impede air flow or so large that the beans fall through. They preferably provide an open area, e.g., about 15 to 75 percent of the total area on the bottom of the tray, sufficient to bring about rapid roasting. The rim is preferably greater than the average diameter of the coffee beans. A rim 13 or 31 typically extends five eighths of an inch above the bottom 11 or 32 of the tray.

Referring now to FIGS. 6 and 7 the roaster of FIGS. 1 and 2 is shown within which are one or more packages 40 of coffee beans each constituting a suitable portion of coffee. The bag material may be cellophane, polyethylene or other suitable film material and it may be printed with advertising material or instructions. The roaster and bags of coffee beans are enclosed in a paper board box 41 having side walls 42, end walls 43, a bottom 44 and a top 45. The top has a hole 46 formed in it for viewing the contents which may be covered, if desired, with a clear plastic sheet (not shown). One or both ends 43 may be hinged with a tab to fit in the box for enclosure during shipment and storage and which can be pulled out for access.

Referring again to the Figures in their entirety, the perforations 12 and 33 are illustrative. Different patterns may be used, e.g., spiral, concentric circles, straight lines of perforations on staggered centers, etc. Further, the roaster body need not be circular; it may be angular. The perforations may be provided by cells as in an egg crate type of structure. The perforations may be round or angular and if angular, they may be square, triangular or pentagons.

Various materials of construction may be used. If the roaster is intended for sustained re-use, it will be made of sturdier, e.g., thicker, material. If it is intended for a single use or a few uses, it may be made of lighter, e.g., thinner, material. A foil thickness of about 0.0035 inch is recommended. Aluminum is the preferred material. It is widely and economically available in an assortment of thicknesses; it is resistant to heat and oxidation; it is non-toxic and acceptable as a packaging agent and as a utensil in contact with food; and it is attractive in appearance. However, other materials, e.g., copper or stainless steel, may be used, also ceramic material, organic polymers such as Teflon which are suitable for cooking utensils and glass.

The perforations 12 and 33 in FIGS. 2 and 3 are described above as being formed by punching or piercing a solid sheet of metal, i.e., the bottom of the tray. However, the tray bottom may be formed otherwise, e.g., by molding, or by coiling a strip of metal, e.g., a strip of aluminum, into the shape of a spiral in which case the spaces between the turns of the coil will serve as the openings or perforations and will function like the holes 12 and 33 and the vertical strips will serve as the downward projections 12a and 33a. Also a network of separate pieces may be assembled, such as in an egg crate type of structure and the openings or cells formed by such a structure will perform the function of the holes 12 and 33 and the material separating the open spaces or cells will perform the function of the projections 12a and 33a.

The roaster of FIG. 1 may be used on an open source of heat such as the hot plate of FIG. 3 by providing it with a bottom support to keep the bottom 11 out of direct contact with the source of heat and with a cover having an opening.

The roaster of the present invention is also applicable to the roasting of other beans and of nuts, e.g., sunflower seeds, pumpkin seeds, hazel nuts, almonds, peanuts and cereal grains such as corn and wheat.

It will, therefore, be apparent that new and advantageous coffee roasters have been provided which are also useful for roasting other beans and nuts.

I claim:

1. A roaster adapted to roast green coffee beans which comprises:
    (a) a horizontal support formed by a sheet of non-combustible heat conductive material formed with a multiplicity of openings which are small enough to retain a thin layer of coffee beans on the upper surface of the support, the number, pattern and area of the openings being such that radiant heat and hot air will pass freely and uniformly through the support,
    (b) said horizontal support having an upper surface and a lower surface and being formed beneath the lower surface with projecting portions of the material of the support which project below the lower surface and which serve as chimneys and heat conductors,
    (c) a rim surrounding the upper surface of said horizontal support having a height not substantially greater than required to prevent the roasting beans from falling from the support,
    (d) a reflector above and forming with the horizontal support an upper space, said reflector being capable of reflecting radiant heat back upon a layer of coffee beans on the support, such reflector being so designed and placed that it will not materially impede evacuation by convection of gases and smoke generated by the roasting process,
    (e) a source of radiant heat beneath and spaced from the horizontal support adapted to heat uniformly the horizontal support and a layer of coffee beans supported thereon,
    (f) there being a lower space between the horizontal support and the source of radiant heat which is substantially unobstructed,
    the design and configuration of the horizontal support, the reflector and the source of radiant heat being such that during roasting of coffee beans on the horizontal support air heated by the source of radiant heat moves freely, uniformly and directly upwardly from the source of radiant heat through the lower space, the horizontal support and the layer of coffee beans into the upper space and thence out of the roaster, such movement being induced substantially solely by the source of radiant heat whereby the green coffee beans are heated by the combination of radiation, conduction and convection to their isothermal point, moisture is evaporated from the beans at such isothermal point and the temperature of the dried beans then rises to effect roasting of the beans and development and retention of a desirable flavor.

2. The roaster of claim 1 wherein said horizontal support and rim are of aluminum foil construction.

3. The roaster of claim 1 wherein said projecting portions are formed by punching the support.

* * * * *